United States Patent Office.

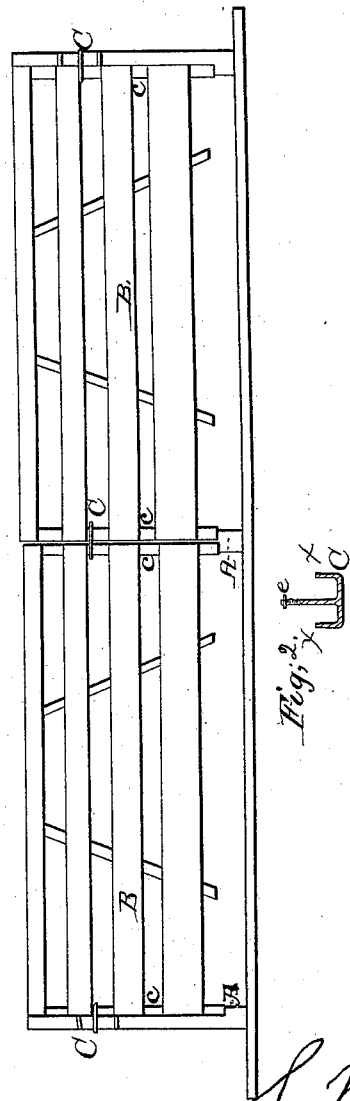

S. B. PIERCE, OF HOMER, NEW YORK.

Letters Patent No. 80,661, dated August 4, 1868; antedated July 29, 1868.

IMPROVEMENT IN FENCES.

The Schedule referred to in these Letters Patent and making part of the same.

TO ALL WHOM IT MAY CONCERN:

Be it known that I, S. B. PIERCE, of Homer, in the county of Cortland, and in the State of New York, have invented certain new and useful Improvements in Fences; and do hereby declare that the following is a full, clear, and exact description thereof, reference being had to the accompanying drawings, and the letters of reference marked thereon.

In the annexed drawings, making a part of this specification, A A represent ordinary fence-posts, and B B ordinary fence-panels, composed of a series of horizontal slats and cross-slats, $c$ $c$, at each end, and suitable braces, as may be desired.

C represents a double clasp or hook, provided with a screw at the end of the shank, which is designed to pass through a hole in the fence-post A, and the arms or hooks $x$ $x$, to clasp each way the end-pieces $c$ $c$ of the fence-panel B.

After the shank of the hook C is passed through the fence-post A, and the arms $x$ $x$ embrace the end-pieces $c$ $c$, it is drawn up tight, and the fence-panel B thereby secured, by means of a nut, $e$, on the screw of the shank of the hook C.

It will readily be seen that any one of the panels B may be taken down whenever desired, and readjusted without any trouble, by means of a common wrench, and therefore any part of a fence may be used as a gate, or be taken down for a team to pass through, or for any other purpose, and put up again without delay or trouble, by means of the clasp C, which is a cheap and convenient fastening for fence-panels.

The clasp C is made somewhat similar to the usual T-head screw, and can be made to secure the fence-sections B B at any suitable distance from the ground.

What I claim, is—

The combination of the fence-panels B B, clasp C, as constructed, and posts A, for forming a portable fence, as set forth.

In testimony that I claim the foregoing, I have hereunto set my hand, this 31st day of December, 1867.

S. B. PIERCE.

Witnesses:
C. M. ALEXANDER,
J. M. MASON.